US012646321B2

(12) United States Patent
Hakata et al.

(10) Patent No.: US 12,646,321 B2
(45) Date of Patent: Jun. 2, 2026

(54) INFORMATION PROCESSING DEVICE, INFORMATION PROCESSING SYSTEM, AND INFORMATION PROCESSING METHOD FOR OBTAINING AN ANGLE OF VIEW OF AN INDICATED DESIGNATED AREA OF A VIDEO IMAGE TO BE DISPLAYED

(71) Applicants: Mayu Hakata, Kanagawa (JP); Kenichiro Morita, Tokyo (JP); Hidekuni Annaka, Saitama (JP)

(72) Inventors: Mayu Hakata, Kanagawa (JP); Kenichiro Morita, Tokyo (JP); Hidekuni Annaka, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 856 days.

(21) Appl. No.: 17/841,677

(22) Filed: Jun. 16, 2022

(65) Prior Publication Data

US 2022/0406060 A1 Dec. 22, 2022

(30) Foreign Application Priority Data

Jun. 21, 2021 (JP) ................................ 2021-102282
Apr. 15, 2022 (JP) ................................ 2022-067655

(51) Int. Cl.
    *G06V 20/40*     (2022.01)
    *G06T 7/73*     (2017.01)
    *G06V 10/24*     (2022.01)

(52) U.S. Cl.
    CPC ................ *G06V 20/46* (2022.01); *G06T 7/73* (2017.01); *G06V 10/24* (2022.01); *G06V 20/49* (2022.01); *G06V 2201/07* (2022.01)

(58) Field of Classification Search
    CPC ........ G06V 20/46; G06V 10/24; G06V 20/49; G06V 2201/07; G06V 10/16; G06T 7/73
    See application file for complete search history.

(56) References Cited

U.S. PATENT DOCUMENTS 6,359,647 B1 * 3/2002 Sengupta ......... G08B 13/19641
    348/E7.086
2001/0024233 A1 * 9/2001 Urisaka ................ H04N 23/661
    348/E7.086

(Continued)

FOREIGN PATENT DOCUMENTS

JP     09289634 A * 11/1997 ....... G08B 13/19645
JP     10126668 A * 5/1998

(Continued)

*Primary Examiner* — Emily C Terrell
*Assistant Examiner* — Julia Z. Yao
(74) *Attorney, Agent, or Firm* — XSENSUS LLP

(57) ABSTRACT

An information processing device includes circuitry to obtain coordinates of an attention point in an area of which a video image is to be displayed, based on information indicating a designated area and received from a terminal device, select an image capturing device based on the coordinates of the attention point, and obtain an angle of view in which angles each of which is formed by a corresponding one of two first straight lines and a second straight line are adjusted to have same degrees with each other. Each first straight line connects the image capturing device and a corresponding one of ends of the area. The second straight line connects the image capturing device and the attention point. The circuitry determines a display area adjusted based on the angle of view and transmits, to the terminal device, information on the image capturing device and information on the display area.

9 Claims, 9 Drawing Sheets

(56) References Cited

U.S. PATENT DOCUMENTS

| | | | | |
|---|---|---|---|---|
| 2013/0342720 A1* | 12/2013 | Azami | ................... | H04N 7/183 |
| | | | | 348/222.1 |
| 2015/0109452 A1* | 4/2015 | Fujimatsu | ........ | G08B 13/19682 |
| | | | | 348/159 |
| 2017/0019629 A1* | 1/2017 | Fukasawa | ............. | H04L 51/043 |
| 2017/0256072 A1* | 9/2017 | Shimmoto | ............. | G06V 10/95 |
| 2017/0374078 A1 | 12/2017 | Hakata et al. | | |
| 2018/0182065 A1* | 6/2018 | Yoshida | ............. | H04N 5/44504 |
| 2019/0082144 A1 | 3/2019 | Hakata et al. | | |
| 2019/0098211 A1* | 3/2019 | Ohmura | ................. | H04N 7/155 |
| 2019/0098253 A1 | 3/2019 | Soneda et al. | | |
| 2019/0124269 A1* | 4/2019 | Irie | ...................... | H04N 23/698 |
| 2019/0132521 A1* | 5/2019 | Fujita | ................... | H04N 23/698 |
| 2019/0260976 A1* | 8/2019 | Ishii | ...................... | G06F 3/1446 |
| 2019/0306004 A1 | 10/2019 | Hakata et al. | | |
| 2019/0306201 A1 | 10/2019 | Ohmura et al. | | |
| 2019/0391778 A1* | 12/2019 | Asai | ........................ | G06T 11/60 |
| 2020/0045230 A1 | 2/2020 | Ohmura et al. | | |
| 2020/0045244 A1 | 2/2020 | Ohmura et al. | | |
| 2020/0244510 A1 | 7/2020 | Hakata et al. | | |
| 2020/0274904 A1 | 8/2020 | Ohmura et al. | | |
| 2020/0382712 A1* | 12/2020 | Heo | ........................ | G06T 3/047 |
| 2021/0099669 A1 | 4/2021 | Shiro et al. | | |
| 2021/0125602 A1 | 4/2021 | Hakata et al. | | |
| 2021/0126978 A1 | 4/2021 | Hasegawa et al. | | |
| 2021/0152731 A1* | 5/2021 | Wakamatsu | ........... | H04N 23/61 |
| 2021/0224945 A1* | 7/2021 | Okuyama | ............ | H04N 23/667 |
| 2021/0321036 A1* | 10/2021 | Iwabuchi | ............... | G03B 15/00 |
| 2022/0094850 A1 | 3/2022 | Morita et al. | | |

FOREIGN PATENT DOCUMENTS

| | | | | |
|---|---|---|---|---|
| JP | 10178581 | A | * | 6/1998 |
| JP | 2012004630 | A | * | 1/2012 |
| JP | 2013-236215 | | | 11/2013 |
| JP | 2016052002 | A | * | 4/2016 |
| JP | 2018-180305 | | | 11/2018 |
| JP | 2020-141288 | | | 9/2020 |
| JP | 2020154460 | A | * | 9/2020 |
| JP | 2021-039468 | | | 3/2021 |
| JP | 2022-050979 | | | 3/2022 |

* cited by examiner

START

OBTAIN ANGLES ($\alpha$, $\beta$) — S50

OBTAIN ANGLE OF VIEW — S51

DETERMINE AREA INFORMATION — S52

END

INFORMATION PROCESSING DEVICE, INFORMATION PROCESSING SYSTEM, AND INFORMATION PROCESSING METHOD FOR OBTAINING AN ANGLE OF VIEW OF AN INDICATED DESIGNATED AREA OF A VIDEO IMAGE TO BE DISPLAYED

CROSS-REFERENCE TO RELATED APPLICATION

This patent application is based on and claims priority pursuant to 35 U.S.C. § 119(a) to Japanese Patent Application Nos. 2021-102282,filed on Jun. 21, 2021, and 2022-067655, filed on Apr. 15, 2022, in the Japan Patent Office, the entire disclosures of which are hereby incorporated by reference.

BACKGROUND

Technical Field

Embodiments of the present disclosure relate to an information processing device, an information processing system, and an information processing method.

Related Art

Systems that use a plurality of cameras (image capturing devices) connected to a communication network for viewing an image including a video image of an area that is designated on a map by a user are known. A technique of calculating an angle of view based on a position (attention point) designated by a user on a map and a position of a camera and determining a display area of a captured image is known.

SUMMARY

An embodiment of the present disclosure includes an information processing device including circuitry to obtain coordinates of an attention point in an area of which a video image is to be displayed, based on information indicating a designated area. The information is received from a terminal device. The circuitry selects an image capturing device based on the coordinates of the attention point, and obtains an angle of view in which angles each of which is formed by a corresponding one of two first straight lines and a second straight line are adjusted to have same degrees with each other. Each of the two first straight line connects the image capturing device and a corresponding one of ends of the area. The second straight line connects the image capturing device and the attention point. The circuitry determines a display area adjusted based on the angle of view and transmits, to the terminal device, device information that is information on the image capturing device and area information that is information on the display area.

An embodiment of the present disclosure includes an information processing system including an information processing device including information processing circuitry and a terminal device including terminal device circuitry. The information processing circuitry obtains coordinates of an attention point in an area of which a video image is to be displayed, based on information indicating a designated area. The information is received from a terminal device. The circuitry selects an image capturing device based on the coordinates of the attention point, and obtains an angle of view in which angles each of which is formed by a corresponding one of two first straight lines and a second straight line are adjusted to have same degrees with each other. Each of the two first straight line connects the image capturing device and a corresponding one of ends of the area. The second straight line connects the image capturing device and the attention point. The circuitry determines a display area adjusted based on the angle of view and transmits, to the terminal device, device information that is information on the image capturing device and area information that is information on the display area. The terminal device circuitry receives an operation of designating the area according to a user operation, and controls a display to display the device information and the area information.

An embodiment of the present disclosure includes an information processing method including obtaining coordinates of an attention point in an area of which a video image is to be displayed, based on information indicating a designated area. The information is received from a terminal device. The method includes selecting an image capturing device based on the coordinates of the attention point and obtaining an angle of view in which angles each of which is formed by a corresponding one of two first straight lines and a second straight line are adjusted to have same degrees with each other. Each of the two first straight line connects the image capturing device and a corresponding one of ends of the area. The second straight line connects the image capturing device and the attention point. The method includes determining a display area adjusted based on the angle of view and transmitting, to the terminal device, device information that is information on the image capturing device and area information that is information on the display area.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
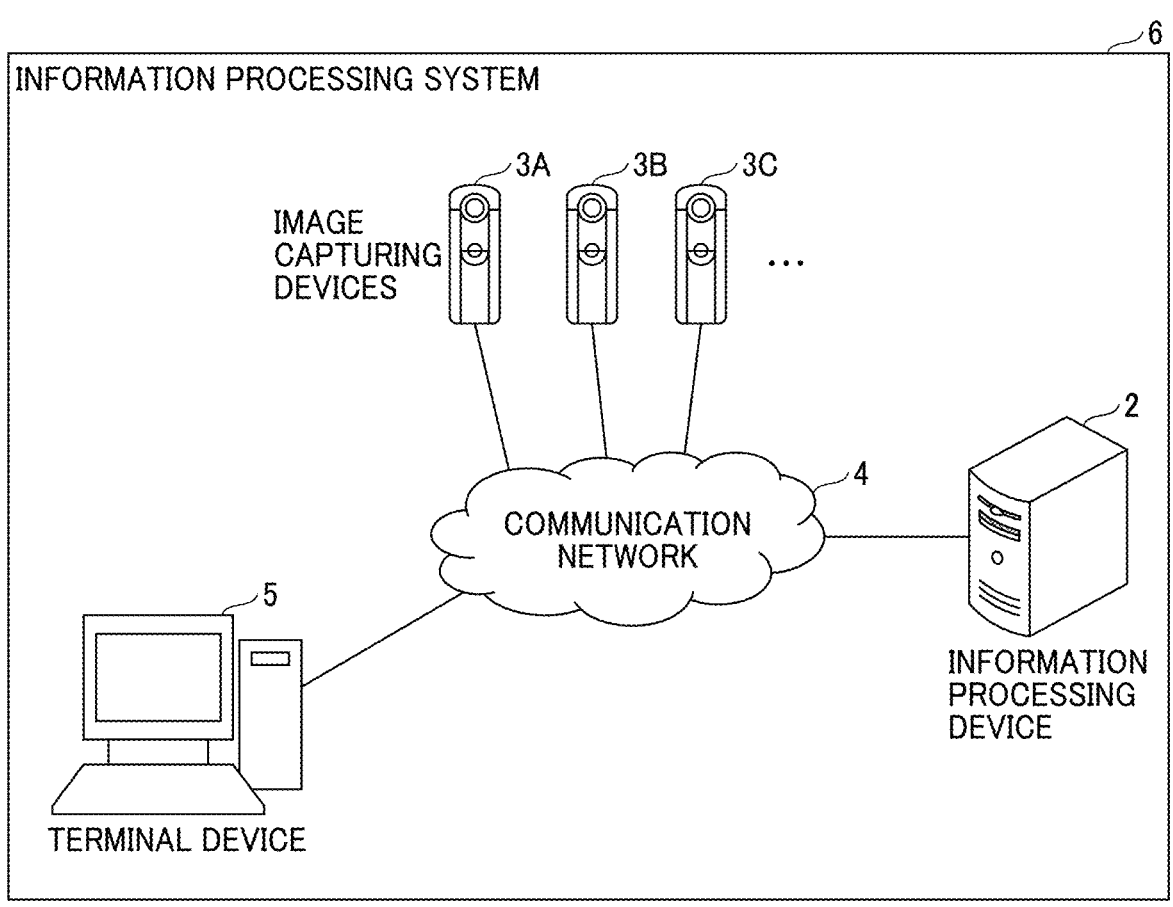
FIG. 1 is a diagram illustrating an example of a schematic diagram of an information processing system according to an exemplary embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of an information processing device, an information processing system, an information processing method, and a non-transitory recording medium according to one or more embodiments of the present disclosure, with reference to the attached drawings.

First Embodiment

System Configuration

FIG. 1 is a schematic diagram illustrating an example of an information processing system 6 according to an exemplary embodiment of the present disclosure. The information processing system 6 includes at least one image capturing device 3, a terminal device 5, and an information processing device 2, and each device is communicably connected to each other via a communication network 4. In case that the image capturing device 3 includes a plurality of image capturing devices 3, each of the plurality of image capturing devices 3 is referred to as an image capturing device 3A, 3B, 3C, or the like. The image capturing device 3 distributes a video image captured by a camera to, for example, the terminal device 5 via the communication network 4. The image capturing device 3 may be set in each of a plurality of different sites. Alternatively, the image capturing device 3 may be set in a single site in a manner that a video image of the entire range of a floor in an office is to be displayed, for example. In addition, the image capturing device 3 may distribute, at the same time as the video image, audio obtained via a microphone.

The terminal device 5 transmits to the information processing device 2 a display request indicating a request for displaying a video image of an area designated according to a user operation performed on a map. The area designated by a user according to the user operation may be referred to as a designated area in the following description of embodiments. The terminal device 5 receives device information that is information on the image capturing device 3, which transmits the video image, and area information that is information on a display area of video image from the information processing device 2. The terminal device 5 further receives video image information that is information on a video image from the image capturing device 3 and displays the video image of the designated area.

The information processing device 2 receives the display request indicating a request for displaying a video image of a designated area from the terminal device 5 and transmits the device information that is information on the image capturing device 3 that is one selected and the area information that is information on a display area of video image to the terminal device 5.

In the following description of embodiments, the video image to be distributed from the image capturing device 3 includes a moving image and a still image that is periodically distributed. In the description of embodiments, the video image may be referred to as an image, but there is no difference in meaning between the video image and the image.

Hardware Configuration

Figure 2:
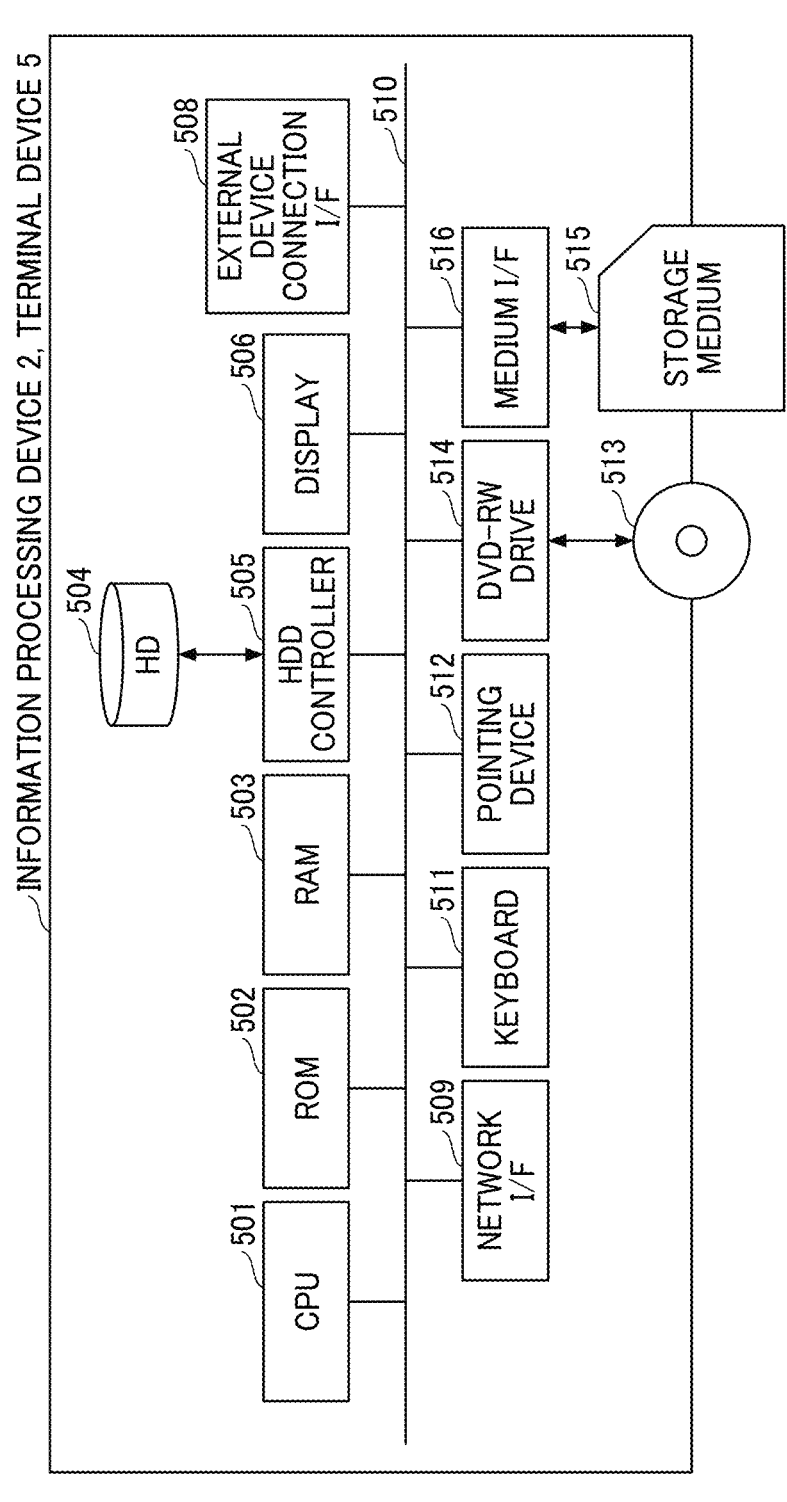
FIG. 2 is a block diagram illustrating an example of a hardware configuration applicable to each of an information processing device and a terminal device according to the exemplary embodiment of the present disclosure.

FIG. 2 is a block diagram illustrating an example of a hardware configuration applicable to each of the information processing device 2 and the terminal device 5 according to the exemplary embodiment of the present disclosure. As illustrated in FIG. 2, each of the information processing device 2 and the terminal device 5 is implemented by a computer, and includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disc rewritable (DVD-RW) drive 514, and a medium I/F 516.

The CPU 501 performs overall control of each of the information processing device 2 and the terminal device 5. The ROM 502 stores programs such as an initial program loader (IPL) to boot the CPU 501. The RAM 503 is used as a work area for the CPU 501. The HD 504 stores various data such as a program. The HDD controller 505 controls reading and writing of various data from and to the HD 504 under control of the CPU 501. The display 506 displays various information such as a cursor, a menu, a window, a character, or an image. The external device connection I/F 508 is an interface for connecting various external devices. Examples of the external devices include, but not limited to, a universal serial bus (USB) memory and a printer. The network I/F 509 is an interface for performing data communication using the network N2. The bus line 510 is, for example, an address bus or a data bus, which electrically connects the elements such as the CPU 501 illustrated in FIG. 6.

The keyboard 511 is an example of an input device provided with a plurality of keys used to input characters, numerals, or various instructions. The pointing device 512 is an example of an input device that allows a user to select or execute various instructions, select an item for processing, or move a cursor being displayed. The DVD-RW drive 514 reads and writes various data from and to a DVD-RW 513, which is an example of a removable storage medium (recording medium). The DVD-RW drive 514 is not limited to the DVD-RW and may be a digital versatile disc-recordable (DVD-R), for example. The medium I/F 516 controls reading and writing (storing) of data from and to a storage medium 515 such as a flash memory.

Functions

Figure 3:
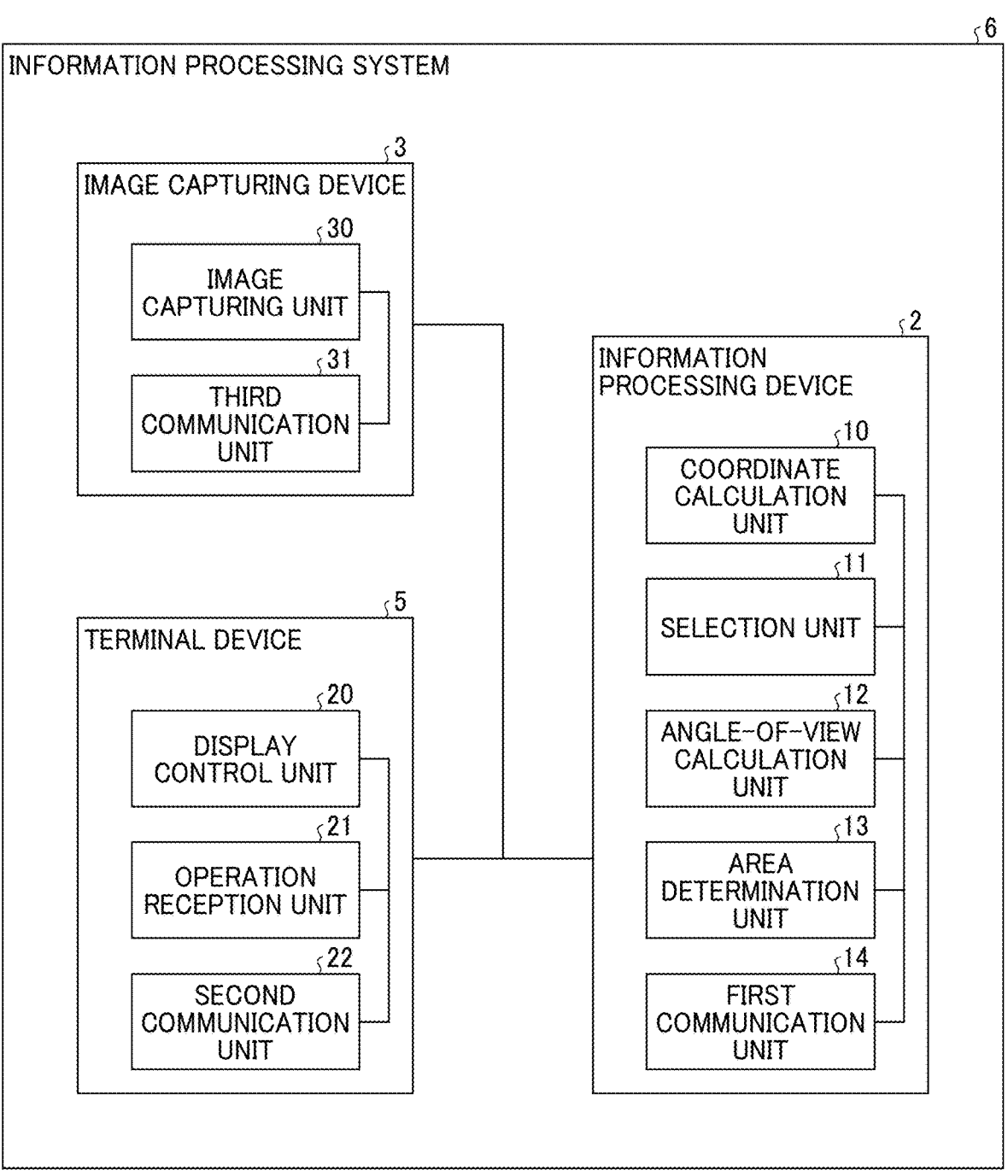
FIG. 3 is a block diagram illustrating an example of a functional configuration of an information processing system according to the exemplary embodiment of the present disclosure.

FIG. 3 is a block diagram illustrating an example of a functional configuration of the information processing system 6 according to the exemplary embodiment of the present disclosure. As illustrated in FIG. 3, the information processing system 6 includes the information processing device 2, the terminal device 5, and the image capturing device 3 as devices having main functional units. The functional units are implemented by the CPU 501 executing an instruction included in one or more programs installed on the information processing device 2 or the terminal device 5, for example.

Functional Units of Information Processing Device

The information processing device 2 includes a coordinate calculation unit 10, a selection unit 11, an angle-of-view calculation unit 12, an area determination unit 13, and a first communication unit 14.

The coordinate calculation unit 10 calculates coordinates of an attention point based on coordinates of a start point and coordinates of an end point that indicate a designated area designated on a map according to a user operation. The start point and the end point are designated by coordinates of two vertices at two opposite corners of a rectangle. In a case that the designated area is a rectangle, coordinates of an intersection point of diagonal lines of the rectangle are calculated to be obtained as an attention point in the designated area. The attention point is a point that is to be a center in displaying an image of the designated area.

Based on the coordinates of the attention point calculated by the coordinate calculation unit 10, the selection unit 11 selects, from among the plurality of image capturing devices 3, one (the image capturing device 3) that is at a position from which an image of a position corresponding to the attention point can be captured and to which the attention point is the closest among the plurality of image capturing devices 3.

The angle-of-view calculation unit 12 calculates to obtain degrees of two angles ($\alpha$, $\beta$) each of which is formed by straight lines to both ends of the designated area and a straight line to the attention point, which is serving as a center. Although a value of the calculated angle of view varies depending on a positional relationship among the attention point, the image capturing device 3, and the designated area, the angle of view calculation unit 12 obtains an angle of view by adjusting so that the attention point is positioned on a straight line that bisects the angle of view. Specifically, when the two angles each of which is formed in relation to the attention point and corresponding one of the ends of the area are different from each other ($\alpha > \beta$), the angle of view is adjusted in a manner that the narrower angle ($\beta$) is adjusted to be equal to the wider angle ($\alpha$).

The area determination unit 13 determines an area to be displayed with the angle of view adjusted by the angle-of-view calculation unit 12 and determines area information as information used in displaying on the terminal device 5 the video image of the image capturing device 3 selected by the selection unit 11. Based on the area information determined by the area determination unit 13, the terminal device 5 displays the video image by designating an area to be displayed from the video image information received from the image capturing device 3.

The first communication unit 14 receives the display request indicating a request for displaying a designated area from the terminal device 5, and transmits the device information, which indicates information on the image capturing device 3 that is a selected one, and the area information that is information on a display area of video image to be displayed on the terminal device 5 to the terminal device 5.

Functional Units of Terminal Device

The terminal device 5 includes a display control unit 20, an operation reception unit 21, and a second communication unit 22.

The display control unit 20 causes the display 506 of the terminal device 5 to display a map or a video image, for example. The map is used to designate an area of which the video image is to be displayed, according to a user operation. The video image is received from the image capturing device 3.

The operation reception unit 21 receives a user operation of designating coordinates of a start point and an end point to designate an area of which a video image is to be displayed and acquires the coordinates on the map. The operation reception unit 21 further receives a display request indicating a request for displaying a video image of the designated area designated according to the user operation.

The second communication unit 22 transmits the display request indicating a request for displaying a designated area designated according to a user operation to the first communication unit 14 of the information processing device 2 together with information on the designated area (coordinates of a start point and an end point on a map). The second communication unit 22 further receives the device information on the image capturing device 3 that is a selected one and the area information that is information on a display area 66 that is determined by the area determination unit 13 from the information processing device 2. The second communication unit 22 further transmits a request for distributing a video image to the third communication unit 31 of the image capturing device 3 and receives the video image information that is information on a video image from the third communication unit 31 of the image capturing device 3.

Functional Units of Image Capturing Device

The image capturing device 3 includes an image capturing unit 30 and a third communication unit 31.

The image capturing unit 30 captures a video image to be distributed to the terminal device 5.

The third communication unit 31 receives the request for distributing a video image from the second communication unit 22 of the terminal device 5 and transmits the video image information that is information on a video image to the second communication unit 22 of the terminal device 5.

Process

Figure 4:
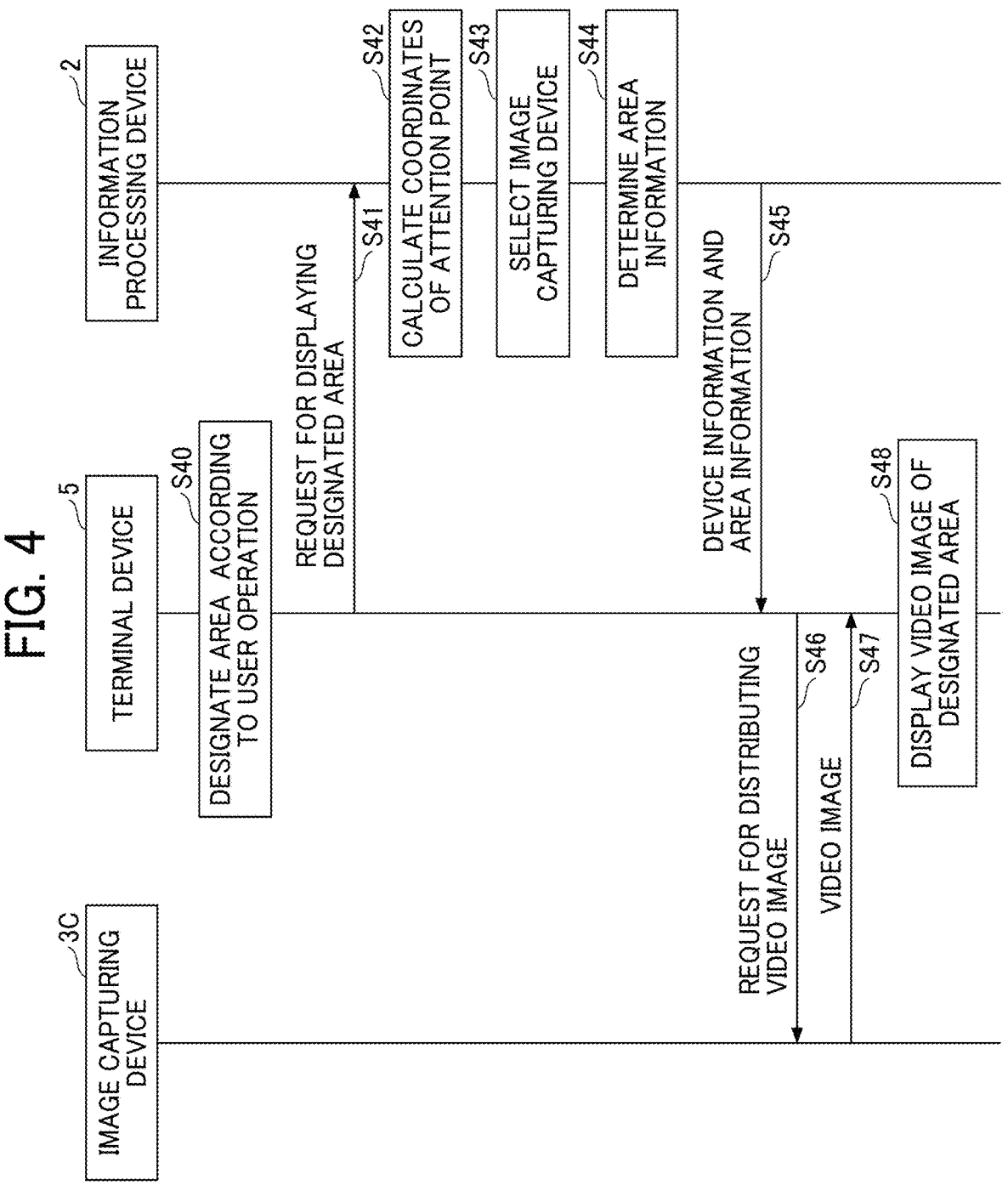
FIG. 4 is a sequence diagram illustrating an example of a process for displaying a video image of a designated area according to the exemplary embodiment of the present disclosure.

FIG. 4 is a sequence diagram illustrating an example of a process for displaying a video image of a designated area according to the exemplary embodiment. Steps of the process are described below.

Figure 5:
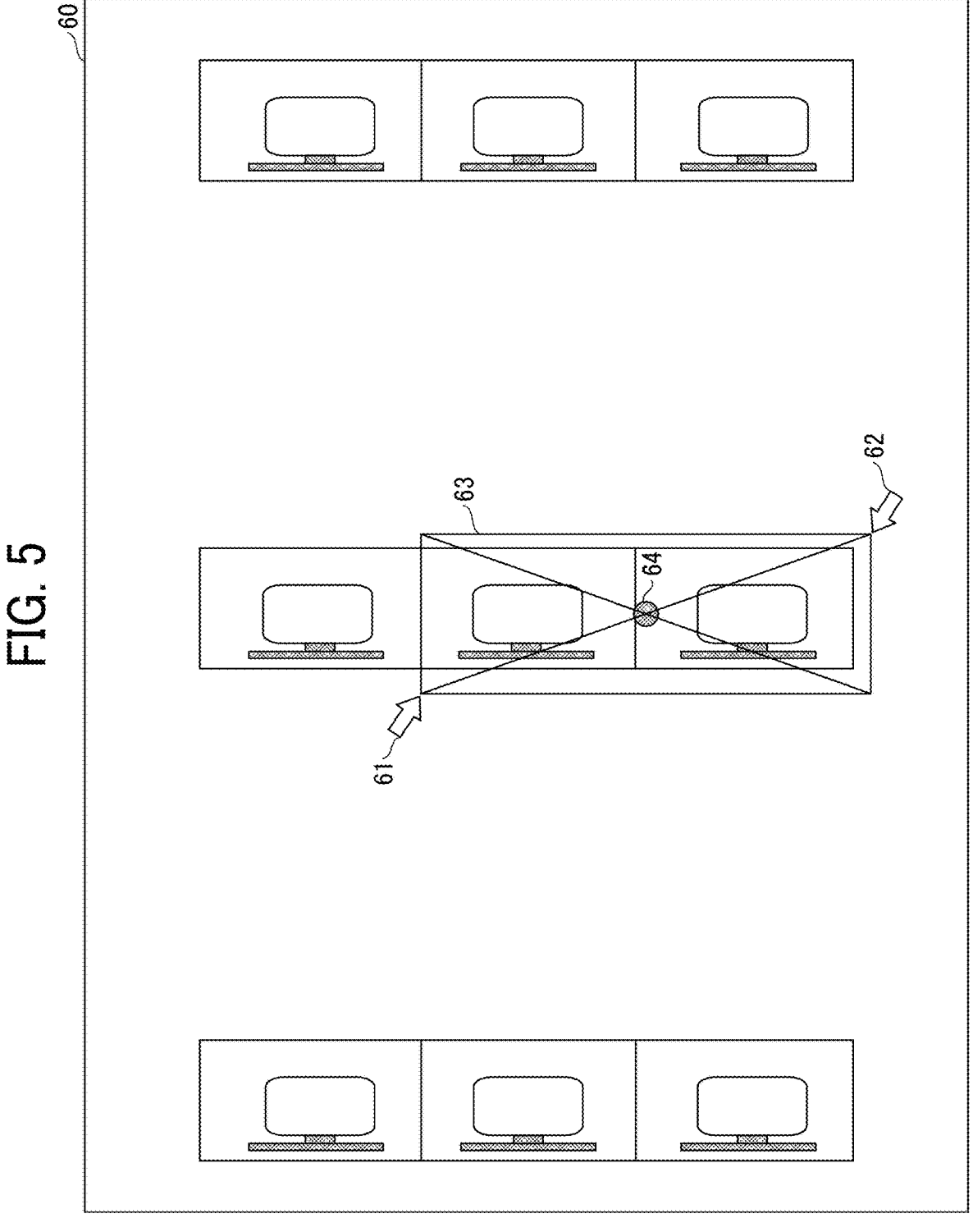
FIG. 5 is a diagram illustrating an example of a screen on which an area of which a video image is to be displayed is designated with a map according to the exemplary embodiment of the present disclosure.

Step S40: The display control unit 20 of the terminal device 5 causes the display 506 to display a map for designating, according to a user operation, an area of which a video image is to be displayed. The video image is captured by the image capturing device 3. The operation reception unit 21 of the terminal device 5 receives a user operation of designating an area of which a video image is to be displayed. FIG. 5 is a diagram illustrating an example of a screen on which an area of which a video image is to be displayed is designated with a map according to the exemplary embodiment of the present disclosure. A map screen 60 illustrated in FIG. 5 includes a planar map (plan view) of an office room as viewed from directly above. In the office room, desks on each of which a personal computer (PC) is set are arranged. The map screen 60 also includes information on a position where the image capturing device 3 is set. It is assumed that the terminal device 5 and the information processing device 2 can refer to the same information related to the map stored in a database, for example. A designated area 63 of which a video image, which is captured by the image capturing device 3, is to be displayed is designated according to a user operation of designating a start point 61 and an end point 62 by using, for example, the pointing device 512. An example of method of the designating is that a user moves a pointer of the pointing device 512 on the screen to a position of the start point 61, presses a button of the pointing device 512, moves the pointer to the end point 62 while keeping pressing the button, and releases the button. The designated area 63 is formed in a rectangular shape in which each side is perpendicular or horizontal to the screen. The operation reception unit 21 receives the user operation of designating the start point 61 and the end point 62 and acquires coordinates of each of the start point 61 and the end point 62 on the map. The operation reception unit 21 receives the display request indicating a request for displaying the designated area 63 designated according to the user operation.

Referring again to FIG. 4, subsequent steps of the process are described below. Step S41: The second communication unit 22 of the terminal device 5 transmits the display request, which is a request for displaying the designated area 63 designated according to the user operation, to the first communication unit 14 of the information processing device 2 together with information on the coordinates of the start point 61 and the end point 62 on the map.

Step S42: The first communication unit 14 of the information processing device 2 passes the received information on the coordinates of the start point 61 and the end point 62 on the map to the coordinate calculation unit 10. The coordinate calculation unit 10 calculates the coordinates of an attention point 64 in FIG. 5 based on the received information. The attention point 64 is an intersection of diagonal lines in a rectangle corresponding to the designated area 63 designated according to the user operation. In a case that the coordinates of the start point 61 are (X1, Y1) and the coordinates of the end point 62 are (X2, Y2), the coordinates of the attention point is calculated as ((X1+Y1)/2, (X2+Y2)/2).

Figure 6:
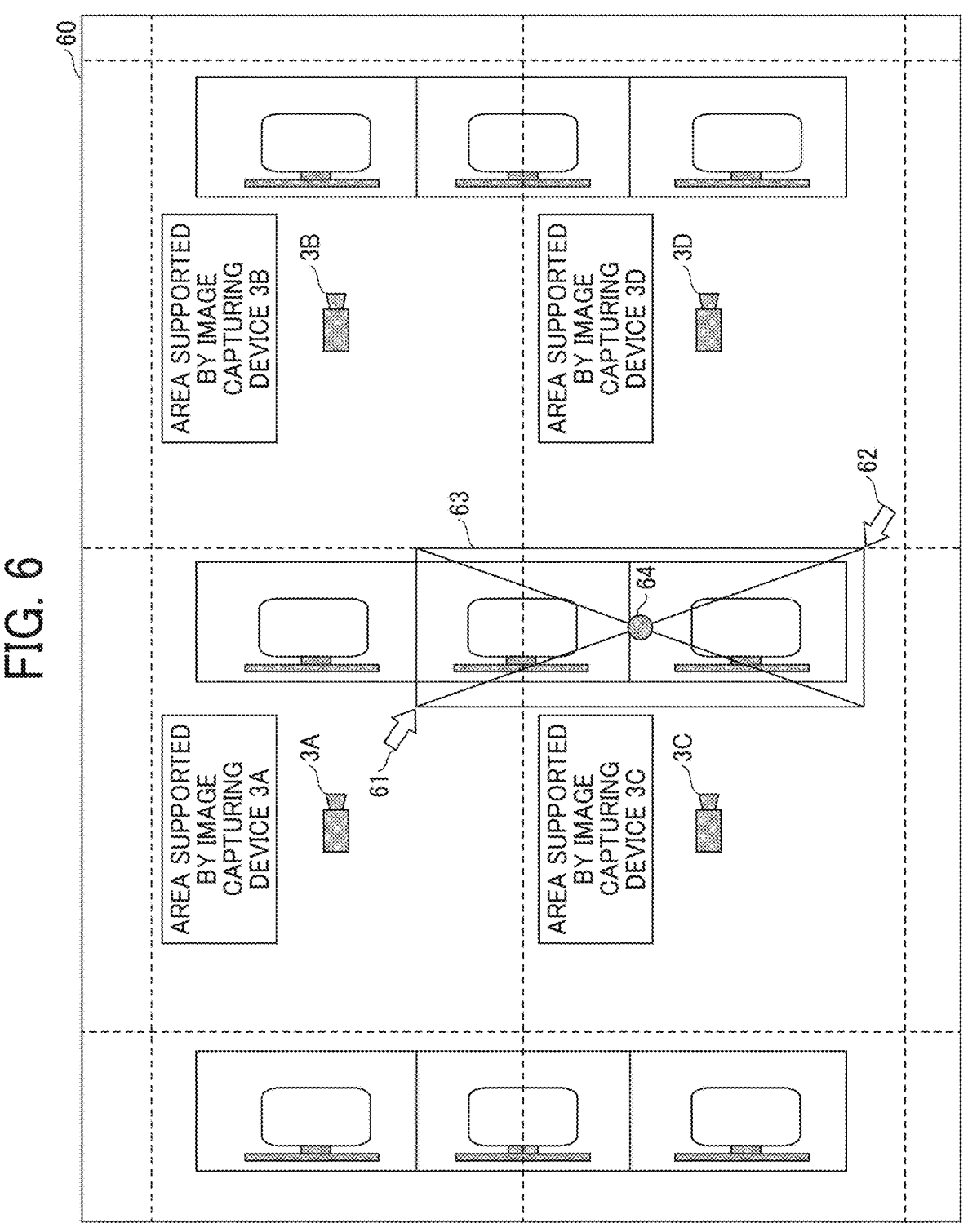
FIG. 6 is a diagram illustrating a method of selecting an image capturing device according to the exemplary embodiment of the present disclosure.

Referring again to FIG. 4, subsequent steps of the process are described below. Step S43: The selection unit 11 of the information processing device 2 selects the image capturing device 3 based on the coordinates, which is calculated by the coordinate calculation unit 10, of the attention point 64. FIG. 6 is a diagram illustrating a method of selecting an image capturing device according to the exemplary embodiment of the present disclosure. In FIG. 6, a position of each of the image capturing devices 3A, 3B, 3C, or 3D and an area supported by a corresponding one of the image capturing devices 3A, 3B, 3C, or 3D are indicated on the map screen 60 corresponding to the office room illustrated in FIG. 5.

Each area supported by the corresponding image capturing device is indicated by dotted lines. The image capturing device 3 may capture an image of a wide area (for example, a spherical video image), and is set near a ceiling in an office with a lens facing obliquely downward. As illustrated in FIG. 6, a supported area is set to include a position of attention point of which an image is to be captured by the corresponding image capturing device, and so that the corresponding image capturing device to be selected is the closest to the attention point. Because the coordinates of the attention point 64 are included in an area supported by the imaging capturing device 3C, the selection unit 11 selects the image capturing device 3C. In the description of embodiments, it is assumed that all the image capturing devices 3 are set at the same height, and distances each of which is between the corresponding image capturing device 3 and the attention point can be compared with one another using a distance on a plane. Alternatively, each distance may be calculated by taking into account a height by adding information on an image capturing area and a height of each image capturing device 3 to the map.

Figure 7:
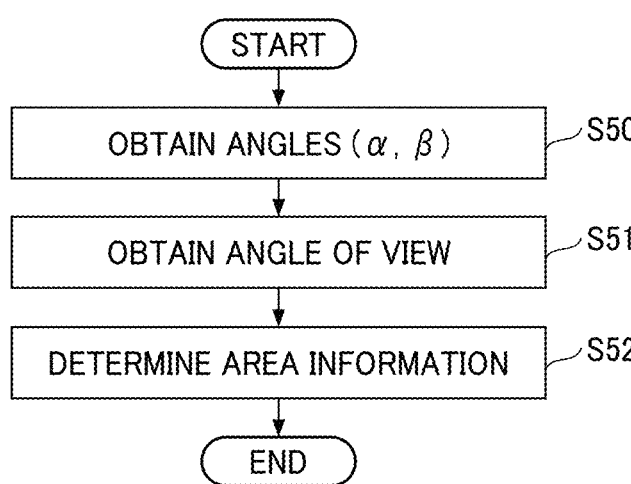
FIG. 7 is a flowchart illustrating an example of a process of determining area information according to the exemplary embodiment of the present disclosure.

Referring again to FIG. 4, subsequent steps of the process are described below. Step S44: The area determination unit 13 of the information processing device 2 determines the area information that is information on a video image to be displayed on the display 506 by the terminal device 5 based on the coordinates of the start point 61 and the end point 62, the coordinates of the attention point 64 calculated by the coordinate calculation unit 10, and coordinates of the image capturing device 3C, which is selected by the selection unit 11. FIG. 7 is a flowchart illustrating an example of a process of determining the area information according to the exemplary embodiment of the present disclosure. Steps of the process are described below.

Figure 8:
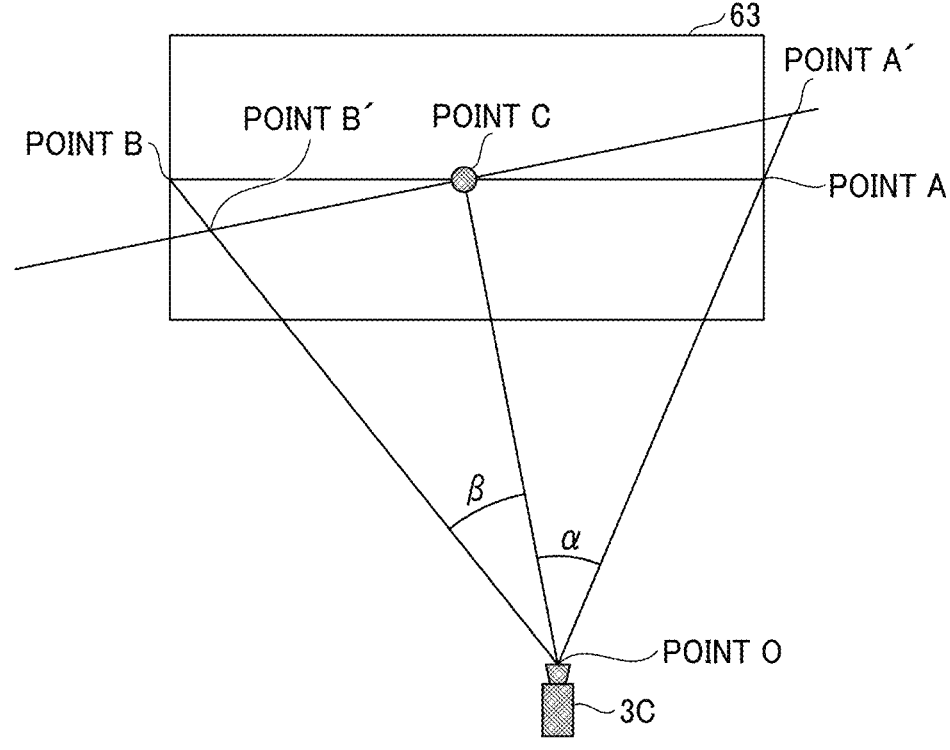
FIG. 8 is a diagram illustrating a method of calculating an angle of view for displaying a designated area according to the exemplary embodiment of the present disclosure.

Step S50: FIG. 8 is a diagram illustrating a method of calculating an angle of view for displaying a designated area according to the exemplary embodiment of the present disclosure. In FIG. 8, the designated area 63, which is also illustrated in FIGS. 5 and 6 and, and the image capturing device 3C, which is a selected one, are illustrated. The attention point 64 may be also referred to as a point C for convenience in the following description. In FIG. 8, the midpoints of the short sides of the rectangle corresponding to the designated area 63 are indicated as a point A and a point B, and the coordinates of the image capturing device 3C are indicated as a point O. In the following description, for example, a straight line connecting the point C and the point O is referred to as a straight line CO, an angle indicated by a straight line AO and the straight line CO is referred to as an angle AOC, and a distance of the straight line CO is expressed as |CO|. In FIG. 8, a straight line that passes through the point C and is perpendicular to the straight line OC is indicated, and a point at which the straight line and a straight line obtained by extending the straight line OA intersect with each other is defined as a point A', and a point at which the straight line intersects the straight line OB is defined as a point B'. When calculating an angle of view for displaying the designated area 63, the angle-of-view calculation unit 12 of the information processing device 2 calculates the angle AOC (=α) and an angle BOC (=β) by using the following equations assuming that the point A and the point B are the endmost points of the designated area 63. Because information on a position and a height of the image capturing device is included in the map, for example, |OC| can be easily calculated.

$$\alpha = \arctan\left(|A'C|/|OC|\right) \qquad \text{Equation 1}$$

$$\beta = \arctan\left(|B'C|/|OC|\right) \qquad \text{Equation 2}$$

Figure 9:
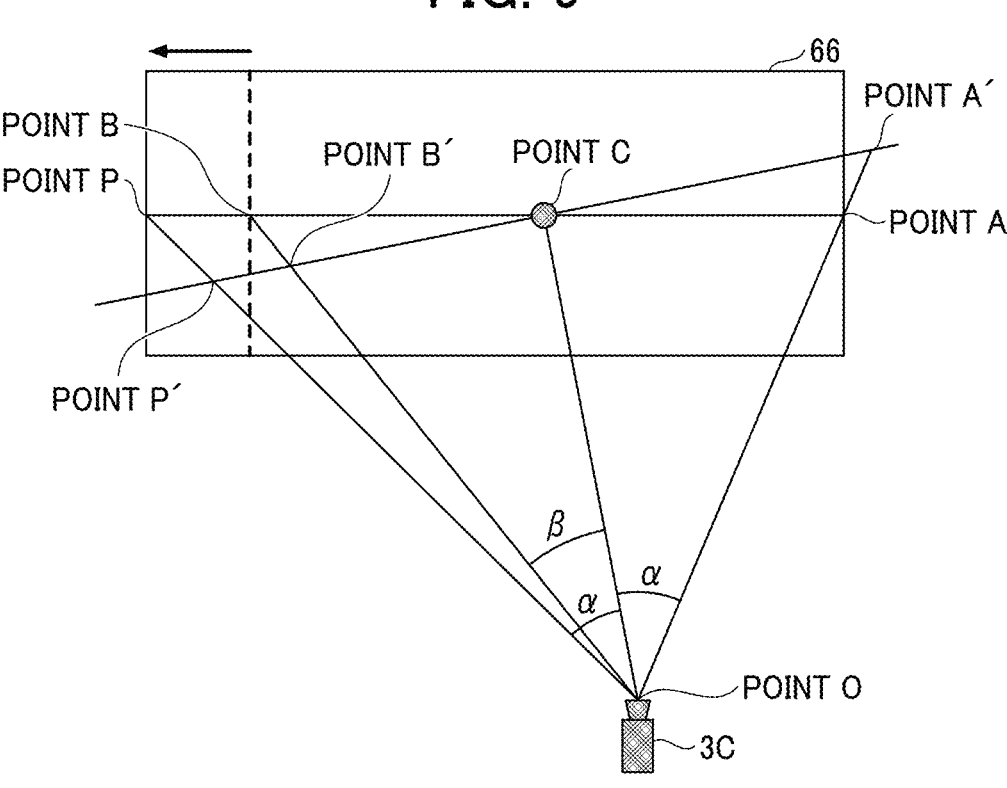
FIG. 9 is a diagram illustrating a method of adjusting an angle of view for displaying a designated area according to an embodiment of the present invention.

Referring again to FIG. 7, in step S51, the angle-of-view calculation unit 12 compares the angles $\alpha$ and $\beta$ calculated in step S50 and uses an angle obtained by doubling the larger angle as the angle of view. In FIG. 8, since $\alpha$ is larger than $\beta$, the angle-of-view calculation unit 12 obtains $2\alpha$, which is twice the larger angle $\alpha$, as the value of the angle of view. The angle of view is adjusted to be $2\alpha$ by expanding the designated area 63 in a manner that the smaller angle $\beta$ is enlarged to be $\alpha$. FIG. 9 is a diagram illustrating an example of a method of adjusting the angle of view for displaying the designated area according to the exemplary embodiment of the present disclosure. In FIG. 9, the angle BOC (=$\beta$) is enlarged to be an angle POC (=$\alpha$). It is assumed that a point P is on an extension of a straight line AB. The designated area 63 is expanded in a manner that the point P is an end of the area, and the expanded area is referred to as a display area 66. In addition, when an intersection point of a straight line OP and an extension line of a straight line A'B' is a point P', an angle P'OC=$\alpha$, and the following expression is established.

$$\alpha = \arctan\left(|P'C|/|OC|\right) \qquad \text{Equation 3}$$

In other words, the point C is the midpoint of the straight line A' P', and A'C=P'C is established.

Figure 10:
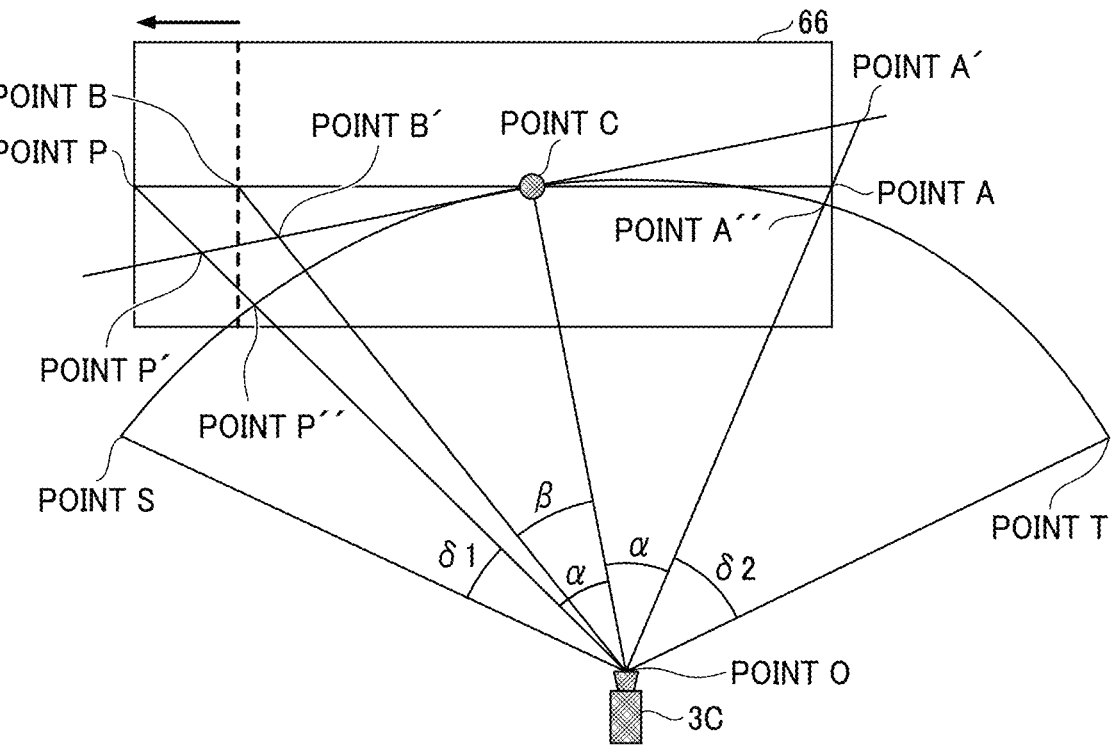
FIG. 10 is a diagram illustrating an example of a method of determining information on a display area according to the exemplary embodiment of the present disclosure.

Referring again to FIG. 7, subsequent steps of the process are described below. Step S52: The area determination unit 13 determines area information that is information on the display area 66 obtained by expanding the designated area 63 based on the angle of view calculated in step S51. FIG. 10 is a diagram illustrating an example of a method of determining information on a display area according to the exemplary embodiment of the present disclosure. In FIG. 10, an area for a video image that is available to be captured by the image capturing device 3C is additionally illustrated with respect to FIG. 9. The area is indicated by a circular arc ST having points S and T as the ends of the area and the point O as a center with the two points S and T as both ends. Assuming that an intersection point of the straight line OA and the circular arc ST is a point A" and an intersection point of the straight line OP and the circular arc ST is a point P", the display area 66 corresponds to the circular arc P"A", and information on the display area 66 can be obtained by using a position on the circular arc ST. Assuming that the angle SOP"=$\delta1$ and the angle TOA"=$\delta2$, the |arc SP"| and the |arc TA"|, which are lengths of the arc SP" and the arc TA", respectively, can be calculated by the following equations.

$$|\text{arc } SP''| = R \times \delta1 \qquad \text{Equation 4}$$

$$|\text{arc } TA''| = R \times \delta2 \qquad \text{Equation 5}$$

The unit of $\delta1$ and $\delta2$ is radian, and R is the radius of the circular arc.

The circular arc ST is drawn on a map, and information of an angle that is a ratio to the entire display area suffices to be transmitted as information on the display area 66. Accordingly, the area determination unit 13 may set values of $\delta1$ and $\alpha$ (or $2\alpha$) as the information on the display area 66, for example. Alternatively, $\delta1/\gamma$ or $\alpha/\gamma$ (or $2\alpha/\gamma$) that is a ratio obtained by dividing by the angle of view $\gamma(\gamma=\delta1+\delta2+2\alpha)$ of the image capturing device 3C may be used. In this case, it is assumed that the value of the angle of view $\gamma$ is a fixed value determined in advance and is shared by the information processing device 2 and the terminal device 5. The angle of view $2\alpha$ is set within a range that does not exceed the angle of view $\gamma$. In other words, the value of a is set in a range in which the point P" does not exceed the point S or the point A" does not exceed the point T, and in a case where the value of a exceeds the range, a maximum value that does not exceed the range is set.

Further, an image area available to be captured by the image capturing device 3C may not be the circular arc ST illustrated in FIG. 10, but may be all directions of 360 degrees. Even in such a case, the information on the display area 66 is determined by the angle from the reference point S in substantially the same manner.

Figure 11:
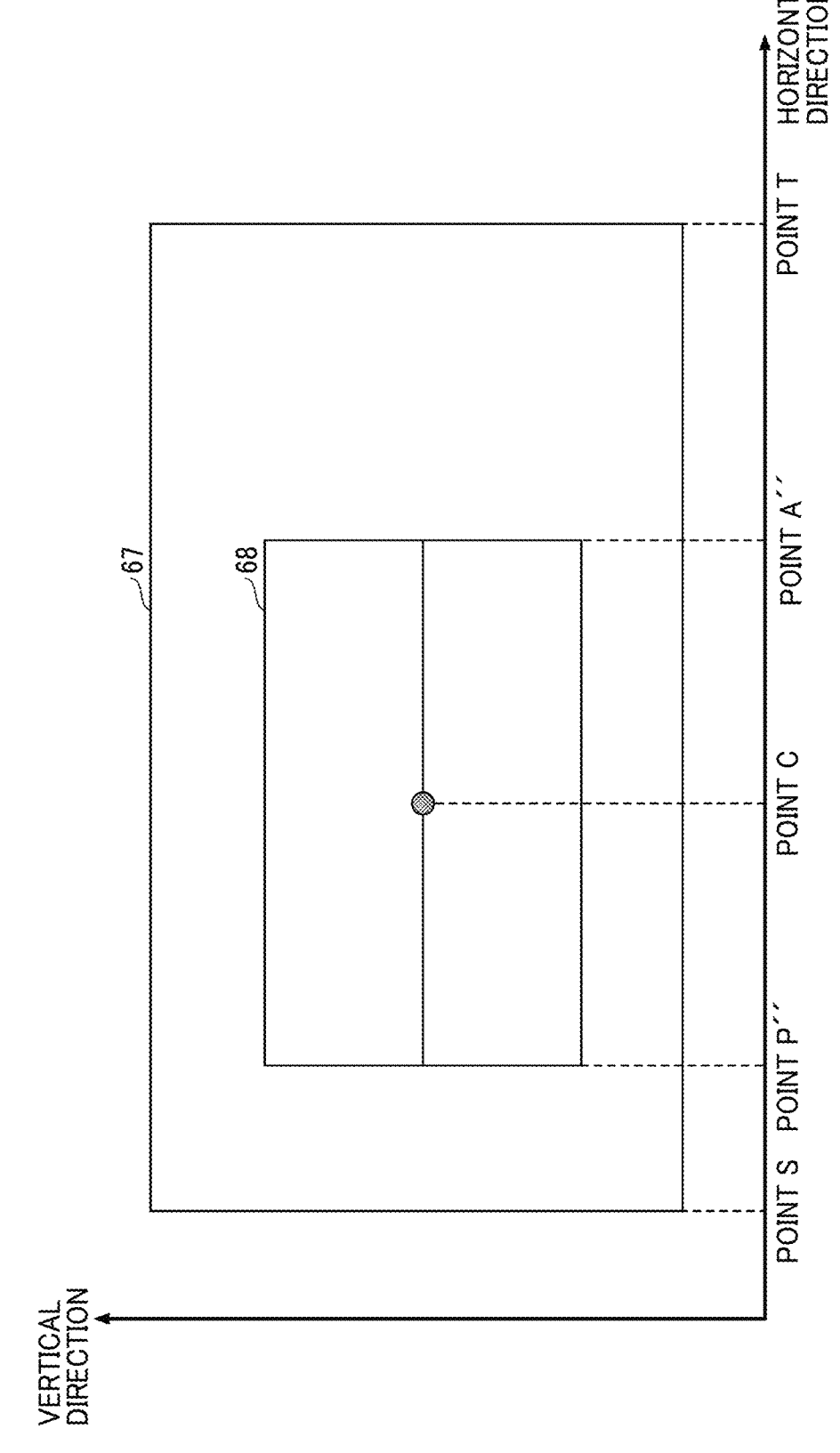
FIG. 11 is a diagram illustrating a display area of a video image to be displayed on the terminal device according to the exemplary embodiment of the present disclosure.

FIG. 11 is a diagram illustrating a display area of a video image to be displayed on the terminal device according to the present embodiment of the present disclosure. In FIG. 11, an entire image (video image) 67 captured by the image capturing device 3C and a display image (video image) 68 corresponding to the display area 66 are illustrated. The display image 68 is an image (video image) displayed on the display 506 of the terminal device 5. The horizontal direction in FIG. 11 corresponds to a straight line on the circular arc ST in FIG. 10. The vertical direction in FIG. 11 is determined by the angle of view in a perpendicular direction of the image capturing device 3C. A length of the entire image 67 in the horizontal direction is a fixed value determined by the number of pixels (=Q) at the angle of view $\gamma$ of the image capturing device 3C, for example. By using the value of the number of pixels Q, the number of pixels from the point S to the point P" is calculated as $Q\times\delta1/\gamma$, the number of pixels from the point P" to the point A" is calculated as $Q\times2\alpha/\gamma$, and the number of pixels from the point A" to the point T is calculated as $Q\times\delta2/\gamma$. Accordingly, the pixels corresponding to the display image 68 in the entire image 67 are identified. The number of pixels in the vertical direction may be identified by a predetermined pixel ratio between the horizontal direction and the vertical direction, or may be one to be displayed according to user operation of setting a position and a size (the number of pixels).

Referring again to FIG. 4, subsequent steps of the process are described below. Step S45: The first communication unit 14 of the information processing device 2 transmits device information that is information on the image capturing device 3 selected by the selection unit 11 and area information that is information on the display area 66 determined by the area determination unit 13 to the second communication unit 22 of the terminal device 5. The information on the image capturing device 3 may be an Internet protocol (IP) address of the image capturing device 3, a host name and domain information, or a predetermined ID usable by the terminal device 5 to identify the image capturing device 3. The information processing device 2 may acquire, from a database, information on an IP address used to transmit data to the terminal device 5 with respect to the image capturing device 3 selected on the map by the selection unit 11.

The display control unit 20 of the terminal device 5 causes the display 506 to display the received information including the information on the image capturing device 3 and the information on the display area 66.

Step S46: The second communication unit 22 of the terminal device 5 transmits a request for distributing a video image to the third communication unit 31 of the image capturing device 3C based on the received information on the image capturing device 3.

Step S47: When the third communication unit 31 of the image capturing device 3C receives the request for distributing a video image from the terminal device 5, the image capturing unit 30 of the image capturing device 3C starts capturing a video image in case capturing a video image has not been executed. The third communication unit 31 of the image capturing device 3C transmits information on the video image captured by the image capturing unit 30 to the terminal device 5. It is assumed that conditions for the video image to be distributed (ex. resolution, bit rate, frame rate) are determined in advance. Alternatively, the conditions may be determined between the terminal device 5 and the image capturing device 3C in accordance with the performance or load of the devices or the load of a communication network before distributing of the video image starts.

Step S48: The second communication unit 22 of the terminal device 5 receives video image information that is information on the video image distributed from the third communication unit 31 of the image capturing device 3C. The display control unit 20 cuts out the video image of the area corresponding to the display image 68 illustrated in FIG. 11 from the entire image 67 and displays the video image on the display 506 of the terminal device 5.

Through the above-described processing, the information processing device 2 calculates an appropriate angle of view for displaying a video image of the area designated by the user on the map displayed on the terminal device 5 and transmit the area information used for displaying the video image to the terminal device 5. In other words, the information processing device 2 adjusts the angle of view and the display area so that the attention point of the area is the center with respect to the area designated by the user on the map. Furthermore, information for identifying a video image of display area from the video image (entire video image) received by the terminal device 5 from the image capturing device 3 is obtainable.

First variation to fourth variation of the first embodiment are described below with respect to difference from the first embodiment in processes.

First Variation of First Embodiment

The first variation relates to an area designated by the user on the map in step S40 in the sequence diagram illustrated in FIG. 4 and of which a video image is to be displayed. In the first variation, a shape of the designated area is a rectangle (including a square) in which each side is horizontal or perpendicular with respect to the screen. However, in the first variation, a designated rectangular (including a square) area is rotatable in an arbitrary direction. In this case, both end points (points corresponding to the points A and B illustrated in FIG. 8) that determine the angle of view may be the middle points of the sides of the rectangle, as in the first embodiment. For the sides of the rectangle, a set having a wider angle of view is selected. Alternatively, the points at both ends that determine the angle of view may be points with which a straight line drawn from the image capturing device 3 is in contact on the outermost side (the angle of view is the widest).

Alternatively, the shape of area may be circular or elliptical. In this case, the points at both ends that determine the angle of view are points with which straight lines drawn from the image capturing device 3 are in contact on the outermost side, and the attention point is the center of a circle or an ellipse.

With respect to the other processing, the same method as the processing described in the first embodiment are applicable.

Second Variation of First Embodiment

The second variation relates to the processing of calculating coordinates of the attention point in step S42 in the sequence diagram illustrated in FIG. 4. In the first embodiment, the coordinates of the attention point are calculated as the coordinates of the intersection of diagonal lines in the rectangular area. In the second variation, after both end points that determine an angle of view are determined, an attention point is selected on a straight line that divides the angle of view into two equal parts. For example, in FIG. 8, an intersection point of a bisector of an angle AOB and the straight line AB is an attention point. Alternatively, the midpoint between two points at which the bisector of the angle AOB is in contact with the designated area 63 may be set as the attention point. When the attention point of is determined as described above, angles (α, β) of the left and right end points from the attention point are equal to each other, and the processing of adjusting the angle of view performed in step 51 illustrated in FIG. 7 in the first embodiment (or described with reference to FIG. 9) does not need to be executed and can be skipped.

With respect to the other processing, the same method as the processing described in the first embodiment are applicable.

Third Variation of First Embodiment

The third variation relates to the processing of adjusting and calculating the angle of view in step S51 in the flowchart illustrated in FIG. 7. In the first embodiment, the angles α and β are compared, and the smaller angle is adjusted to be the larger angle. In other words, when α>β, a value of β was adjusted to be equal to a value of α. In the third variation, for example, when α>β, the value of α is adjusted to be equal to the value of β. The adjustment of the display area can be performed in substantially the same manner as the method illustrated in FIG. 9. Specifically, the point A may be moved to the left in substantially the same manner as the point B is moved to the point P. Alternatively, the values of α and β may be adjusted to be (α+β)/2. In this case, both positions of the point A and the point B are to be adjusted in FIG. 9.

With respect to the other processing, the same method as the processing described in the first embodiment are applicable.

Fourth Variation of First Embodiment

The fourth variation relates to the processing from step S46 to step S48 in the sequence diagram illustrated in FIG. 4. In the first embodiment, the terminal device 5 extracts (cuts out) the image of the designated area from the information of the image received from the image capturing device 3C and displays the extracted image on the display 506. In the fourth variation, in step S46, the second communication unit 22 of the terminal device 5 transmits the area information received from the information processing device 2 in step S45 to the third communication unit 31 of the image capturing device 3 together with the video image distribution request. In step S47, the third communication unit 31 of the image capturing device 3C transmits the information on the video image corresponding to the designated area that is indicated in the area information to the second communication unit 22 of the terminal device 5. In step S48, the display control unit 20 causes the display 506 of the terminal device 5 to display the received video image as it is. The display control unit 20 does not need to cut out the video image of the display image 68 from the entire image 67 illustrated in FIG. 11.

With respect to the other processing, the same method as the processing described in the first embodiment are applicable. In the fourth variation, the terminal device 5 receives from the image capturing device 3C a video image corresponding to the display area alone, and displays the video image. As compared with the processing in the first embodiment, this reduces the load of the video-data encoding processing and the video-data transmission processing in the image capturing device 3C, the load of the video-data decoding processing and the video-data reception processing in the terminal device 5, and the load of the communication network.

The description above concerns some of embodiments of the present disclosure. Embodiments of the present disclosure are not limited to the specific embodiments described above, and various modifications and replacements are possible within the scope of aspects of the disclosure.

For example, the configuration example of the functional block diagram of FIG. 3 is divided according to the main functions in order to facilitate understanding of the processing by the information processing device 2, the terminal device 5, and the information processing system 6. No limitation is intended by how the processes are divided or by the name of the processes. The processes performed by the information processing device 2, the terminal device 5, and the information processing system 6 may be divided into more process units in accordance with the content of the processes. Further, one process can be divided to include a larger number of processes.

Each of the functions in the embodiments described above may be implemented by one or more processing circuits or circuitry. Processing circuitry in this disclosure includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The group of apparatuses or devices described above is one example of plural computing environments that implement the embodiments disclosed in this specification. In some embodiments, the information processing device 2, the terminal device 5, and the information processing system 6 include multiple computing devices, such as a server cluster. The multiple computing devices are configured to communicate with one another through any type of communication link, including a communication network and a shared memory and perform processes disclosed herein.

Each of the second communication unit 22, the first communication unit 14, and the third communication unit 31 may be simply referred to as a communication unit.

An embodiment of the present disclosure includes a non-transitory recording medium storing a plurality of instructions which, when executed by one or more processors, causes the processors to perform a method. The method includes obtaining coordinates of an attention point in an area of which a video image is to be displayed, based on information indicating a designated area. The information is received from a terminal device. The method includes selecting an image capturing device based on the coordinates of the attention point and obtaining an angle of view in which angles each of which is formed by a corresponding one of two first straight lines and a second straight line are adjusted to have same degrees with each other. Each of the two first straight line connects the image capturing device and a corresponding one of ends of the area. The second straight line connects the image capturing device and the attention point. The method includes determining a display area adjusted based on the angle of view and transmitting, to the terminal device, device information that is information on the image capturing device and area information that is information on the display area.

In a related art, when an area is designated on a map, an angle of view is failed to be calculated appropriately. This is because a display position is determined in advance with respect to a specific point on the map, and when the display position is designated as the area, processes such as determining the midpoint of an angle of view or an angle of view for adjusting a selected area are not performed.

According to an embodiment of the present disclosure, an appropriate angle of view for displaying an image of an area designated on a map is obtained.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. An information processing system, comprising:
an information processing device including information processing device circuitry; and
a terminal device including terminal device circuitry configured to:
receive an operation of designating an area according to a user operation; and
transmit information indicating the area to the information processing device,
wherein
the information processing device circuitry is configured to:
obtain coordinates of an attention point in an area of a video image based on the information indicating the area;
select an image capturing device based on the coordinates of the attention point;
obtain an angle of view by (1) comparing two angles, each of which is formed by a corresponding one of two first straight lines and a second straight line, and (2) increasing a size of a smaller one of the two angles to be equal to a larger one of the two angles, wherein the angle of view is equal to a sum of the two angles, wherein the angles are adjusted to have same degrees with each other, each of the two first straight lines connects the image capturing device and a corresponding one of ends of the area, and the second straight line connects the image capturing device and the attention point;
determine a display area adjusted based on the angle of view; and transmit, to the terminal device, device information that is information on the image capturing device and area information that is information on the display area, and the terminal device circuitry is further configured to:
receive the device information and the area information from the information processing device;
transmit, to the image capturing device, the area information and an image distribution request;
receive, from the image capturing device, a display image captured by the image capturing device according to the area information; and
control a display to display the display image.

2. The information processing system of claim 1, wherein the information processing device circuitry selects, as the image capturing device, an image capturing device closest to the attention point from among a plurality of image capturing devices.

3. The information processing system of claim 1, wherein the area is identified by coordinates of two vertices of a diagonal of a rectangle representing the area.

4. The information processing system of claim 3, wherein the information processing device circuitry obtains, as the coordinates of the attention point, an intersection of diagonal lines of the rectangle representing the area.

5. The information processing system of claim 1, wherein the information processing device circuitry sets, as the coordinates of the attention point, a position at which the angles each of which is formed by the corresponding one of the two first straight lines and the second straight line have the same degrees with each other, each of the two first straight lines connecting the image capturing device and the corresponding one of the ends of the area, the second straight line connecting the image capturing device and the attention point.

6. The information processing system of claim 1, wherein the terminal device circuitry receives, from the image capturing device, information on a video image corresponding to the area.

7. The information processing system of claim 1, wherein the user operation designates coordinates of a start point and an end point to designate the area.

8. The information processing system of claim 7, wherein the terminal device circuitry the user operation by receiving input of a user moving a pointer of a pointing device on a screen to a position of the start point, pressing a button of the pointing device, moving the pointer to the end point while pressing the button, and releasing the button.

9. An information processing method, comprising:
obtaining, by an information processing device circuitry of an information processing device, coordinates of an attention point in an area of a video image based on information indicating a designated area, the information being received from a terminal device;
selecting, by the information processing device circuitry, an image capturing device based on the coordinates of the attention point;
obtaining, by the information processing device circuitry an angle of view by (1) comparing two angles, each of which is formed by a corresponding one of two first straight lines and a second straight line, and (2) increasing a size of a smaller one of the two angles to be equal to a larger one of the two angles, wherein the angle of view is equal to a sum of the two angles, wherein the angles are adjusted to have same degrees with each other, each of the two first straight lines connects the image capturing device and a corresponding one of ends of the area, and the second straight line connects the image capturing device and the attention point;
determining, by the information processing device circuitry, a display area adjusted based on the angle of view;
transmitting, to the terminal device, device information that is information on the image capturing device and area information that is information on the display area;
receive, by terminal device circuitry of the terminal device, the device information and the area information from the information processing device;
transmitting, by the terminal device circuitry to the image capturing device, the area information and an image distribution request;
receiving, by the terminal device circuitry from the image capturing device, a display image captured by the image capturing device according to the area information; and
controlling, by the terminal device circuitry, a display to display the display image.

* * * * *